United States Patent [19]

Niki

[11] 4,411,587

[45] Oct. 25, 1983

[54] LOADING APPARATUS

[75] Inventor: Akira Niki, Toyoake, Japan

[73] Assignee: Nagoya Kiko Kabushiki Kaisha, Toyoake, Japan

[21] Appl. No.: 283,161

[22] Filed: Jul. 14, 1981

[30] Foreign Application Priority Data

| Jul. 30, 1980 [JP] | Japan | 55-104867 |
| Sep. 17, 1980 [JP] | Japan | 55-129964 |
| Jun. 23, 1981 [JP] | Japan | 56-98009 |

[51] Int. Cl.³ .......................................... B30B 15/30
[52] U.S. Cl. ................................. 414/752; 414/917; 414/737; 100/207; 74/101
[58] Field of Search .......................... 414/749–752, 414/627, 707, 710, 714, 733, 917; 100/207; 74/99 R, 101; 52/DIG. 4; 403/DIG. 1; 248/206 A; 294/65.5

[56] References Cited

U.S. PATENT DOCUMENTS

| 1,766,573 | 6/1930 | Westin | 414/733 |
| 2,811,266 | 10/1957 | Udal | 414/733 |
| 2,867,185 | 1/1959 | Hayward | 414/733 X |
| 2,980,271 | 4/1961 | Ulinski | 414/707 |
| 3,061,118 | 10/1962 | Halberstadt | 414/917 X |
| 3,175,702 | 3/1965 | Banyas | 414/733 |
| 3,255,893 | 6/1966 | Hainer et al. | 414/728 |
| 3,381,997 | 5/1968 | Fritz et al. | 248/206 A |
| 3,705,525 | 12/1972 | Gilmour et al. | 414/749 X |
| 3,912,317 | 10/1975 | Ohnaka | 414/752 X |
| 4,125,072 | 11/1978 | Maier et al. | 100/207 |

FOREIGN PATENT DOCUMENTS

1170826  11/1969  United Kingdom ............... 100/207

*Primary Examiner*—Robert J. Spar
*Assistant Examiner*—Terrance L. Siemens
*Attorney, Agent, or Firm*—Dennison, Messerole, Pollack & Scheiner

[57] ABSTRACT

A holding apparatus for use in combination with a working machine, where such loading apparatus has a first quadric parallel link body attached to the working machine and adapted to be oscillated within a vertical plane; a second quadric parallel link body attached to the first link body through a L-shaped member for oscillating motion therewith, and having a holder arm assembly effective to hold a workpiece; and a mechanism adapted to reciprocate said holder arm assembly of the second link body.

4 Claims, 12 Drawing Figures

LOADING APPARATUS

BACKGROUND OF THE INVENTION

1. Field of the Invention

This invention relates to a loading apparatus for transferring workpieces such as stampings and machined parts from station to station.

2. Description of the Prior Art

In a conventional loading apparatus known as an automatic loader which is effective for unloading, holding and transferring machined workpieces automatically from station to station, its construction and driving and control systems are fairly complex since the entire operation of the apparatus including unloading, transferring and loading of the workpieces are performed in one cycle motion of the apparatus. Moreover, the prices of automatic loaders are fairly high since in many cases they must be individually designed and manufactured dependent on the type and arrangement of working machines to which the loaders are to be operatively connected. It is also to be noted that as the construction and driving and control systems of a loading apparatus becomes more complex, the related minimum cycle time will be more increased, thereby rendering a tendency for such an automatic loader to be unavailable for unloading, transferring and loading operations of stamped parts for which a short cycle time is essential.

The prior art has also proposed the use of robots for industrial use which are effective for unloading, transferring and loading machined parts. The problems associated with such a robot include that an arm incorporated in the robot must be driven and controlled in accordance with respective directions of travel of the arm to hold the parts and to transfer with the parts held therein. Additionally, such a robot, besides being costly, has proven to reduce availability of limited shop area since its arm requires fairly greater area to travel.

SUMMARY OF THE INVENTION

An object of the present invention is to provide a novel loading apparatus which eliminates the above-mentioned disadvantages associated with the prior art.

Another object of the present invention is to provide a loading apparatus which is simple in construction and is capable of transferring parts while they are held therein.

Other and further objects of the present invention will become obvious upon an understanding of the illustrative embodiment about to be described or will be indicated in the appended claims, and various advantages not referred to herein will occur to one skilled in the art upon employment of the invention in practice.

DETAILED DESCRIPTION OF THE PREFERRED EMBODIMENT

Referring now to FIGS. 1 through 8, there is shown a construction of the first embodiment according to the present invention.

Figure 1:
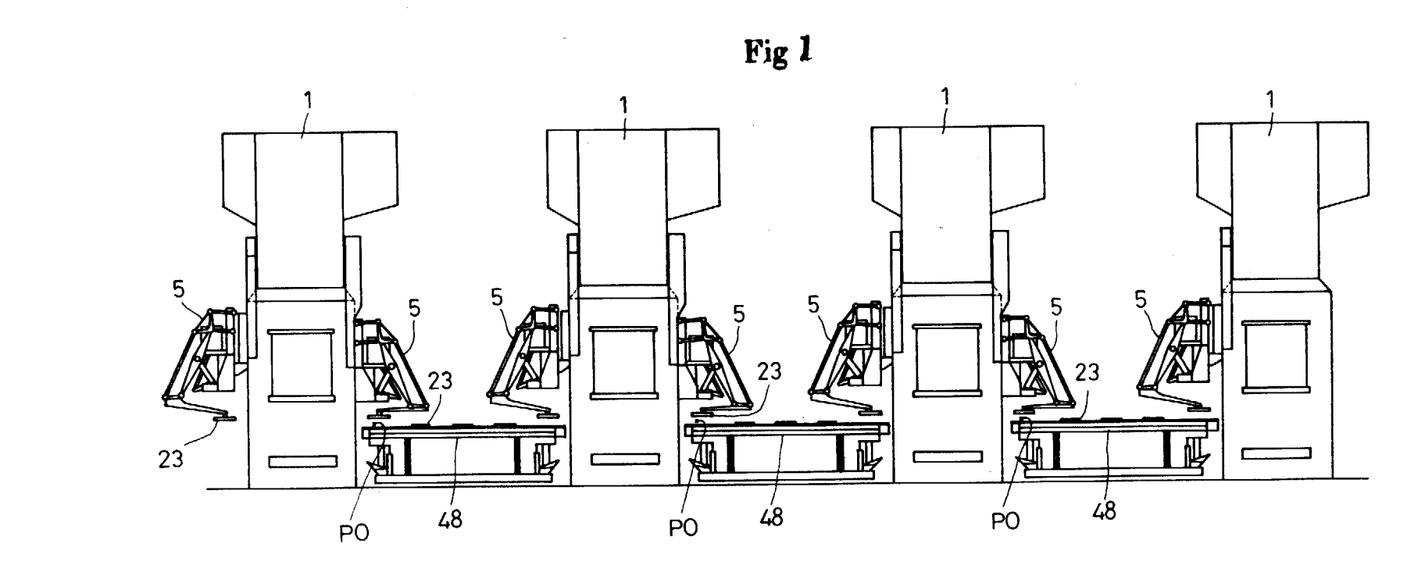
FIG. 1 is a side elevational view of the first embodiment according to the present invention while it is in operation.
Figure 2:
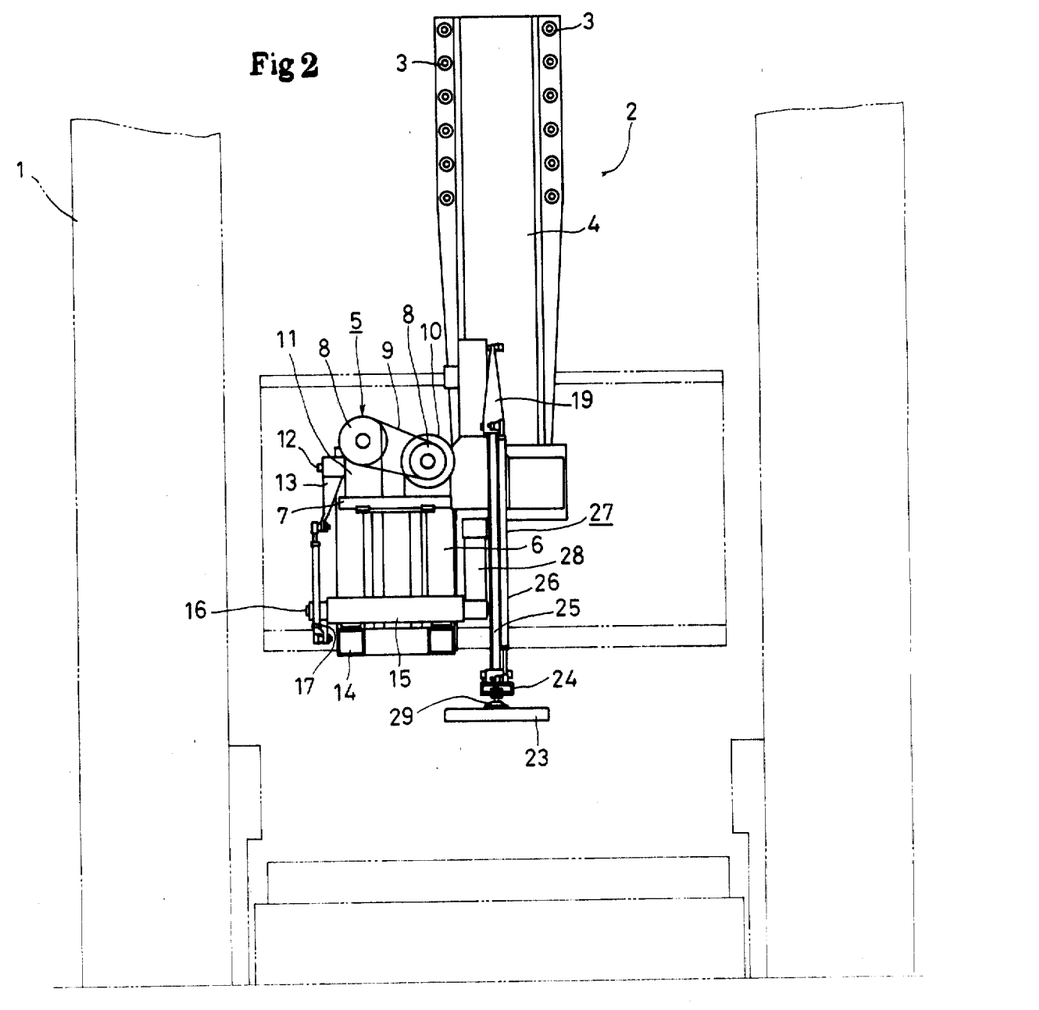
FIG. 2 is an enlarged front elevational view thereof.
Figure 3:
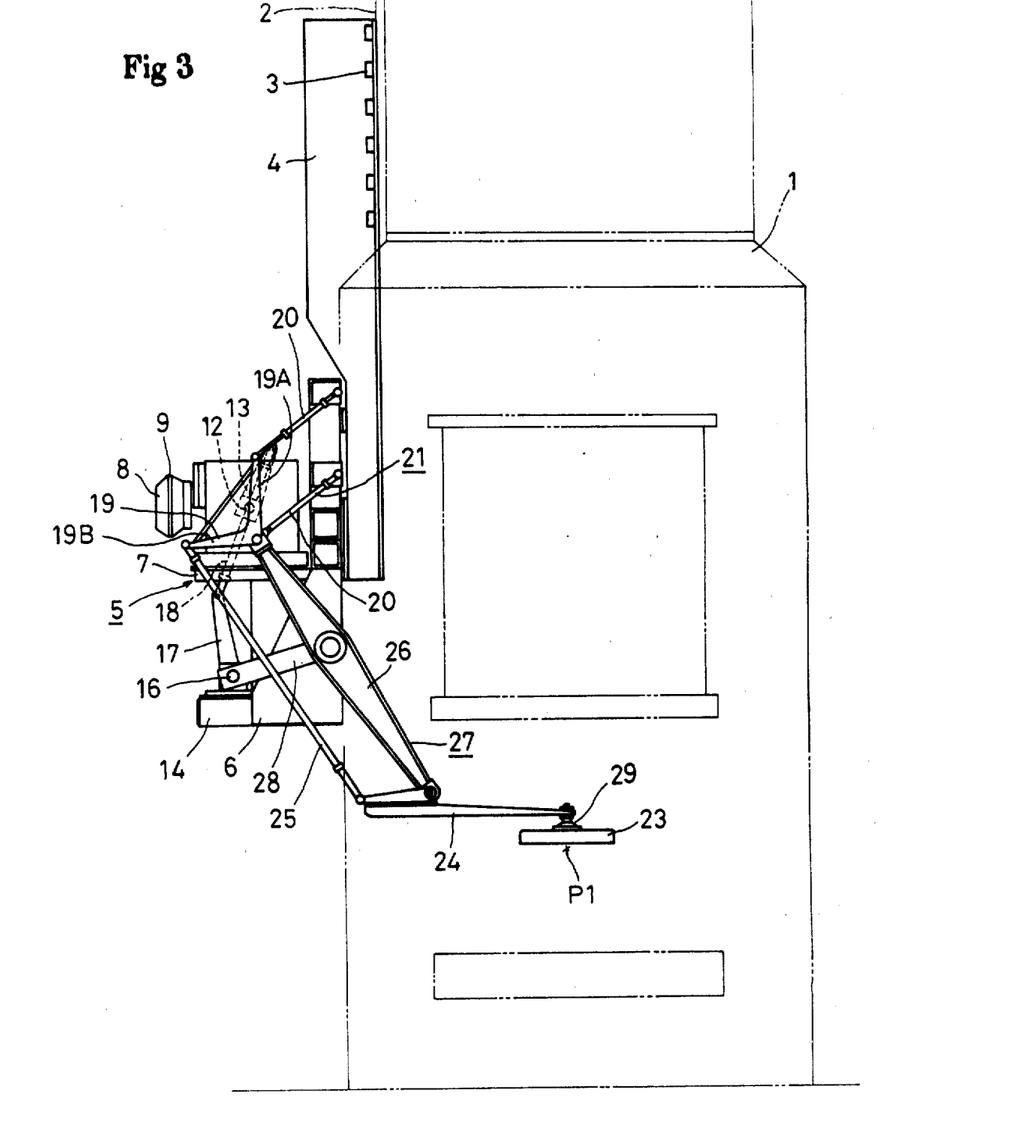
FIGS. 3 and 4 are enlarged side elevational views thereof.

In FIG. 1, there is shown a series of press machines 1 arranged in sequence in accordance with respective working stages of workpieces, each machine having at least one loading apparatus 5 according to the present invention. As generally illustrated in FIGS. 2 and 3, each of the press machines 1 includes a bracket 4 secured to a top frame 2 of the press machine 1 by means of bolts 3. A mounting frame 6 is secured to the bracket 4 by means of bolts (not shown) at an arbitary position in the horizontal plane of FIG. 2. The mounting frame 6 is provided at generally middle portion thereof with a top horizontal frame 7 on which are mounted a motor 10 and a reduction gear 11 connected through pulleys 8 and a belt 9. A crank arm 13 is fixed at its one end to an output shaft 12 of the reduction gear 11. The mounting frame 6 also includes at generally lower portion thereof a bottom horizontal frame 14 which in turn includes a coupling axis 16 supported by a bearing means 15. The other end of the crank arm 13 and one end of an oscillating arm 17 are pivotally connected by a rod 18 so that the oscillating arm 17 may be reciprocated for a given angle determined by the respective length of the crank arm 13, the rod 18 and the oscillating arm 17.

On the right-hand side (as viewed in FIG. 2) of the mounting frame 6, there is pivotally secured a first quadric parallel link 21, one side of which being an arbitary distance between two points disposed vertically on the frame 6 and the other opposing side being a vertical side 19A of a L-shaped parallel-travel arm 19, and these two sides being pivotally connected by a pair of rods 20 of equal length.

On the horizontal side 19B of the L-shaped parallel-travel arm 19, there is connected a second quadric parallel link 27, one side of which being a horizontal side 19B and the other opposing side being a portion of a holder arm assembly 24 which will be described hereinafter, and these two sides being pivotally connected by a primary rod 26 and a secondary rod 25 of equal length. The middle portion of the primary rod 26 is pivotally connected to one end of an oscillating arm 28 which in turn is fixed at its other end to the right-hand portion (as viewed in FIG. 2) of the coupling axis 16.

In operation, when the crank arm 13 is rotated by the motor 10, each of the oscillating arms 17 and 28, being operatively connected through the coupling axis 16, is reciprocated within an equal angle of 100°. It is important to note that the rotational angular amount of the oscillating arm 28 is so designed as to be greater in the rightward direction than in the leftward direction relative to the vertical line passing the coupling axis 16 (as viewed in FIGS. 3 and 4).

Figure 4:
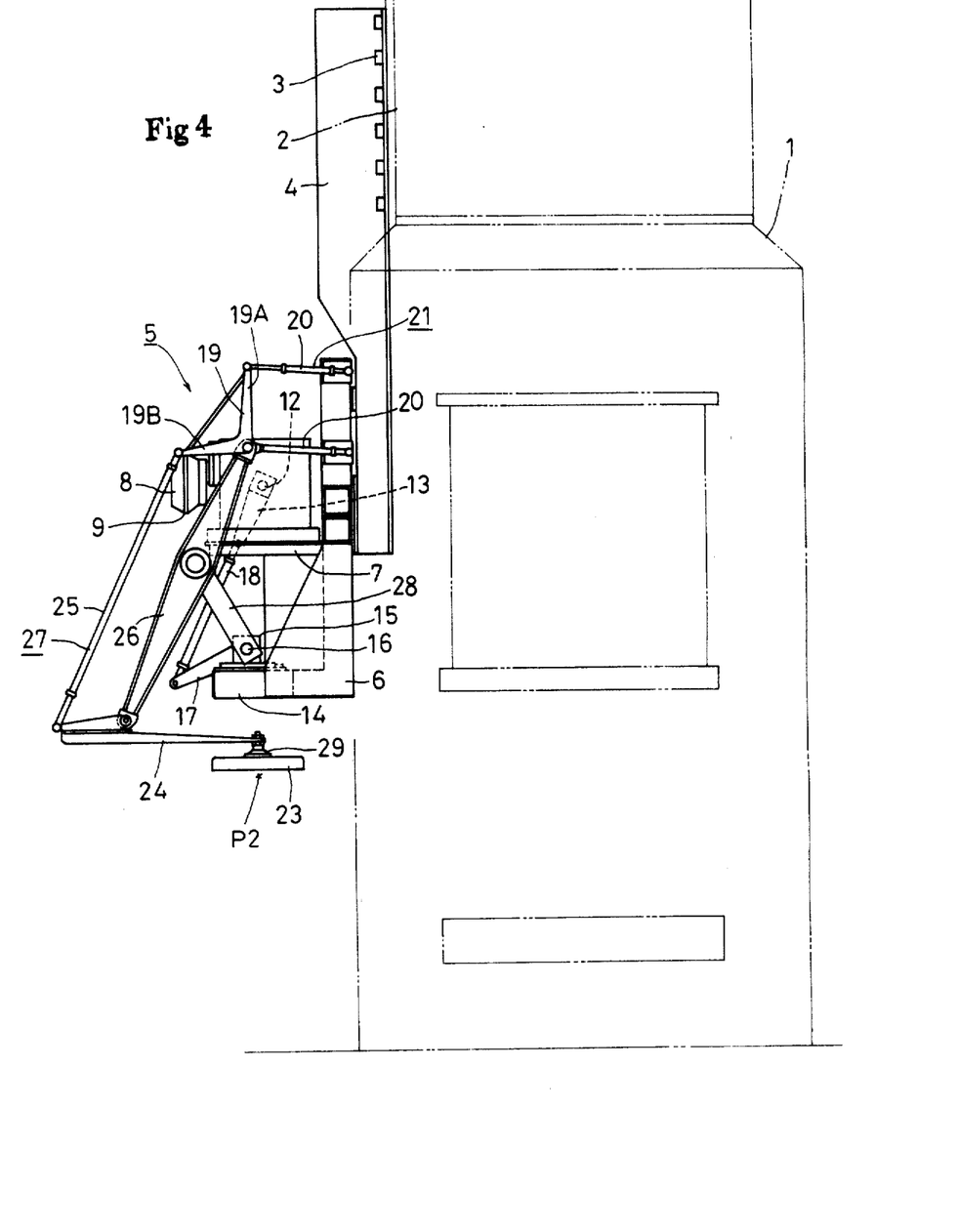

This arrangement enables the holder arm assembly 24 to alter its direction from horizontal to vertical at about the end of oscillating motion of the arm 28, that is, at generally righthand side of FIGS. 3 and 4. The path thus made by the holder arm assembly 24 may be more particularly expressed in a substantially J-shaped locus S1 between positions P1 and P2, where P1 is the advanced position (as viewed in FIG. 3) at which a workpiece 23 is loaded to or unloaded from the respective machine 1 and P2 is the retracted position (as viewed in FIG. 4) at which the operation cycle is initiated.

Figure 6:
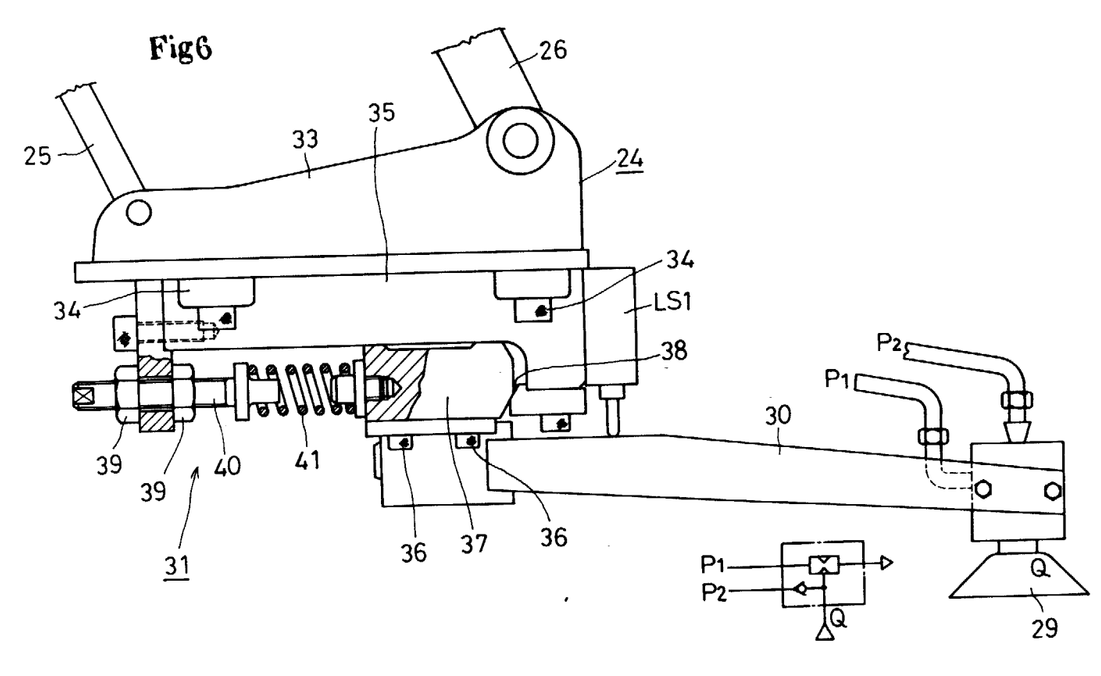
FIG. 6 is a side elevational view of the first embodiment having a spring-set arm holder.
Figures 7, 8:
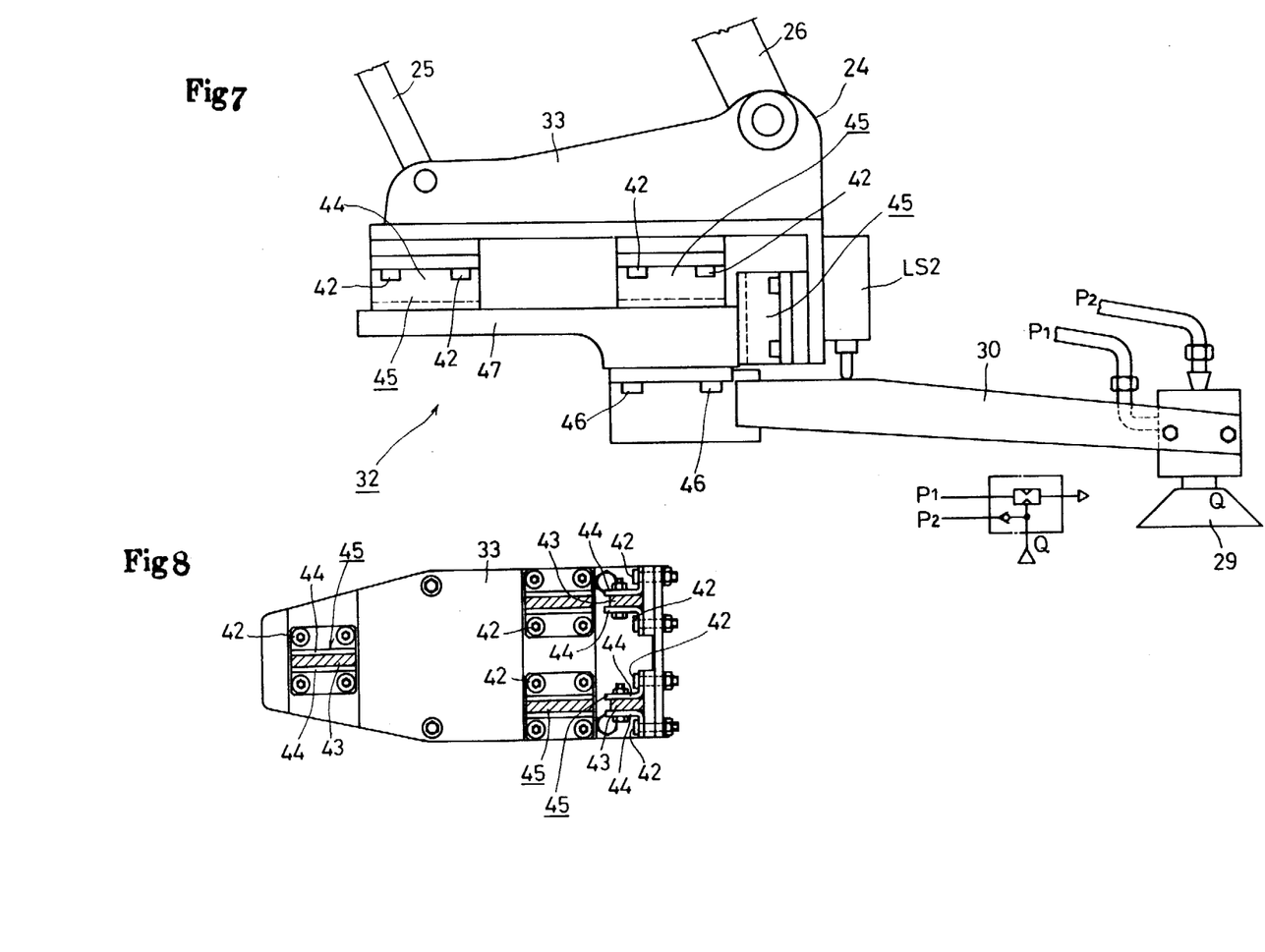
FIG. 7 is a side elevational view of the first embodiment having a magnet-set arm holder.
FIG. 8 is a rear elevational view of the arm holder of FIG. 7.

Further details of the holder arm assembly 24 is seen in FIGS. 6 and 7 and as seen, it consists of an arm support 33 forming one side of the second quadric parallel link 27, an arm 30 having a venturi cap which is effective for holding the workpiece 23 under negative pressure, and a spring-set holder 31 or a magnet-set holder 32 which holds the arm 30 to the arm support 33.

As seen in FIG. 6, the spring-set holder 31 consists of a holder carrier 35 secured to the arm support 33 by means of screws 34, a holder block 37 adapted to abut against a portion 38 of the holder carrier 35 and secured to the arm 30 by means of screws 36; a screw stock 40 secured to the holder carrier 35 with two nuts 39 and slidably inserted in the holder block 37; and a coil spring 41 disposed between the holder block 37 and the screw stock 40 in such a manner that the compression force is effective on the holder block 37. If, during operation with the arm 30 held in the holder carrier 35 as clearly seen in FIG. 6, the foremost end of the arm 30 hits an obstacle or the like to thereby exert an external force to the arm 30 which is greater than the holding power obtained by the spring 41, the holder block 37 will be displaced from its normal position, and the arm 30 will be detached from a limit switch LS1 attached to the holder carrier 35 and cause the motor 10 and subsequently the loading apparatus 5 to stop. Thus, any possible damage to the loading apparatus 5 including the arm 30 may be prevented, assuring the operator's safety.

As generally illustrated in FIGS. 7 and 8, the magnet-set holder 32 includes a plurality of magnetic holders 45 secured to the arm support 33 by screws 42 and a holder block 47 secured to the arm 30 by screws 46. Each of the magnetic holders 45 includes a permanent magnet 43 and a pair of pole plates 44. As should be apparent, the magnetic holders 45 serve to hold the holder block 47, and if the arm 30 is subjected to an external force which is greater than the holding power of the magnets 43, the arm 30 will be displaced from its held position to thereby cause a limit switch LS2 to be activated. Thus, the motor 10 and the loading apparatus 5 will be stopped, in the same manner as discussed in the preceeding paragraphs, and consequently the operator's safety is ensured.

Turning now to FIG. 1, there are shown a series of press machines 1, each having at least one loading apparatus 5 according to the present invention, and a plurality of transfer apparatus 48 disposed between the machines 1 and adapted for transferring workpieces 23 unloaded from one of the machines 1 to a holding position P0 (as viewed in FIG. 1) at which another loading apparatus 5 of the subsequent machine is ready to hold the workpiece 23.

When the ram (not shown) of each of the press machines 1 is in a position immediately before initiating its descent, the holder arm assembly 24 of each loading apparatus 5 is in a fully retracted position as seen in FIG. 1, that is, at the remotest point P2 (see FIG. 5) from each press machine 1.

Figure 5:
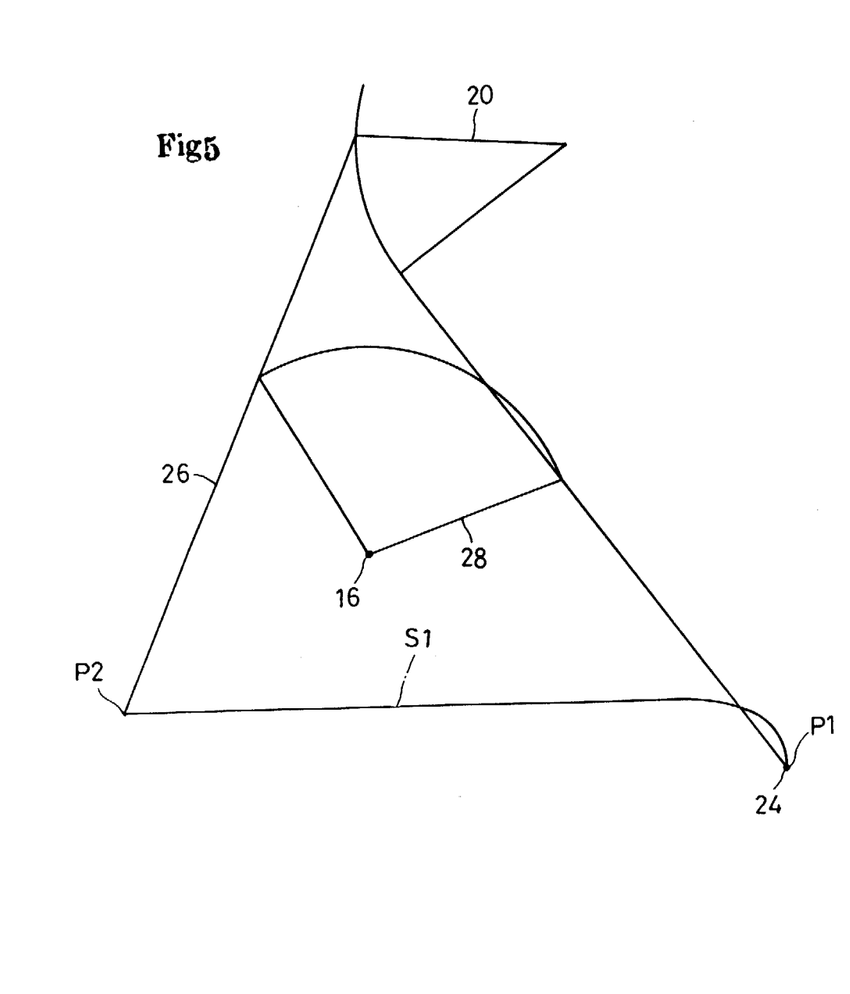
FIG. 5 is an operational diagram thereof.

In operation, as soon as each press machine 1 initiates its working cycle with the holder arm assembly 24 held in its retracted position, both of the oscillating arms 17 and 28 of each loading apparatus 5 make one reciprocating motion through the motor 10 in substantially synchronized manner with the completion of each reciprocating motion of the machine 1, and this causes each of the holder arm assembly 24 to move back and forth in accordance with the locus S1 shown in FIG. 5. The workpieces 23, being removed from each machine by means of the venturi cap 29, are placed on the transfer apparatus 48. Otherwise, the workpieces 23 being machined are loaded on the respective machines 1. It is to be appreciated that because of crank motion of the crank arm 13 and the oscillating arm 17, the workpieces 23 may be transferred by the holder arm assembly 24 in an optimum fashion so as to ascend and descend slowly during the transferring operation.

Figure 9:
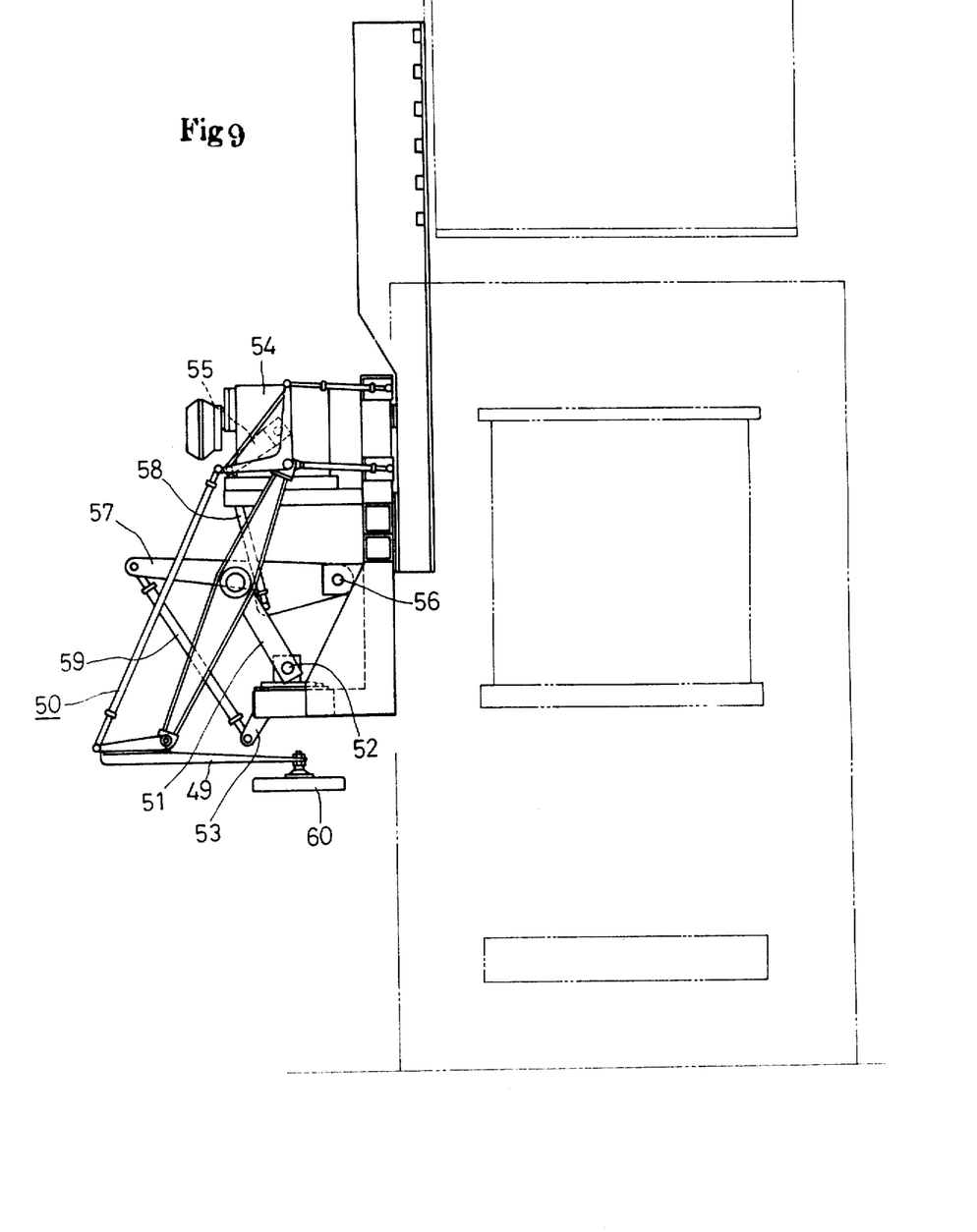
FIG. 9 is a side elevational view of the second embodiment according to the present invention.

Attention is now directed to FIG. 9 which illustrates the second embodiment according to the present invention, the same as that of FIGS. 3 and 4 insofar as the crank arm 13 and oscillating arm 17 are concerned, but employing an additional link connected therebetween for enlarging angles. As generally seen in FIG. 9, instead of using the rod 18 as shown in FIG. 2, a link motion is provided between an oscillating arm 53 and a crank arm 55, consisting of an intermediate arm 57 and rods 58 and 59. The intermediate arm 57 may pivot about an axis 56 mounted on the mounting frame 6 (the same as that of the first embodiment) of the loading apparatus 5. In FIG. 9, there is also shown a quadric parallel link 50 having an oscillating arm 51 fixed at its one end to a coupling axis 52 and pivotally connected at its other end to the link 50, the arrangement being the same as that of FIG. 2.

Figure 10:
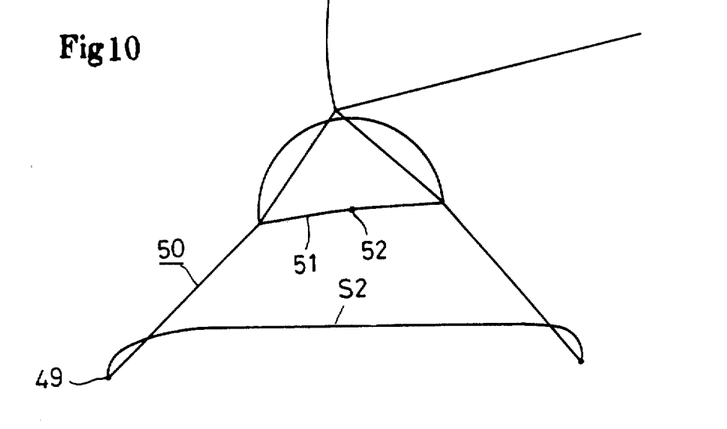
FIG. 10 is an operational diagram thereof.

The arrangement of this embodiment enables the oscillating arm 51 to pivot for 90° on both sides of a vertical line passing the coupling axis 52 and consequently the holder arm assembly 49 to move back and forth in such a manner as represented by a locus S2 in FIG. 10, thereby providing increased ease of loading and unloading operations over the first embodiment.

Figure 11:
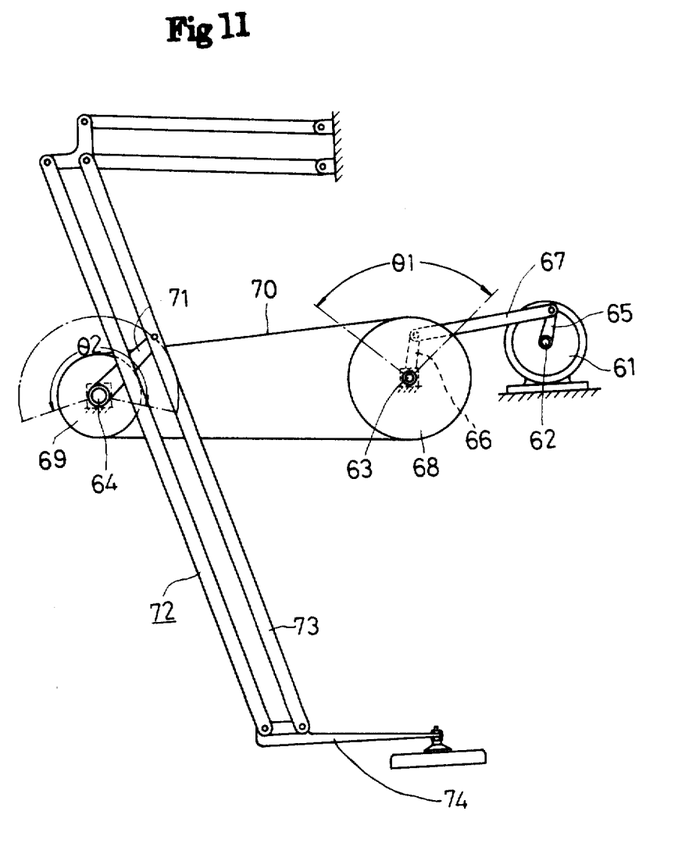
FIG. 11 is a side elevational view of the third embodiment according to the present invention.

FIG. 11 shows the third embodiment according to the present invention, substantially tha same as that of FIG. 9 insofar as the oscillating arm 53 and the crank arm 55 are concerned, but employing pulleys and a belt instead of the intermediate arm 57.

As generally illustrated in FIG. 11, reference numeral 61 is a motor with a reduction gear, and 62 is an output shaft thereof. Rotatable shafts are also shown generally at 63 and 64 having pulleys 68 and 69 each fixedly mounted on the respective shafts 63 and 64 and operatively connected by a belt 70. A crank arm 65 is connected to the output shaft 62, and an oscillating arm 66 is connected to the shaft 63, both of which being connected by a rod 67. There is also shown an oscillating arm 71, one end of which being fixedly connected to the shaft 64 and the other end being pivotally connected to a main rod 73 of a quadric parallel link 72 which is the same as those 27 and 50 according to the first and second embodiments.

Figure 12:
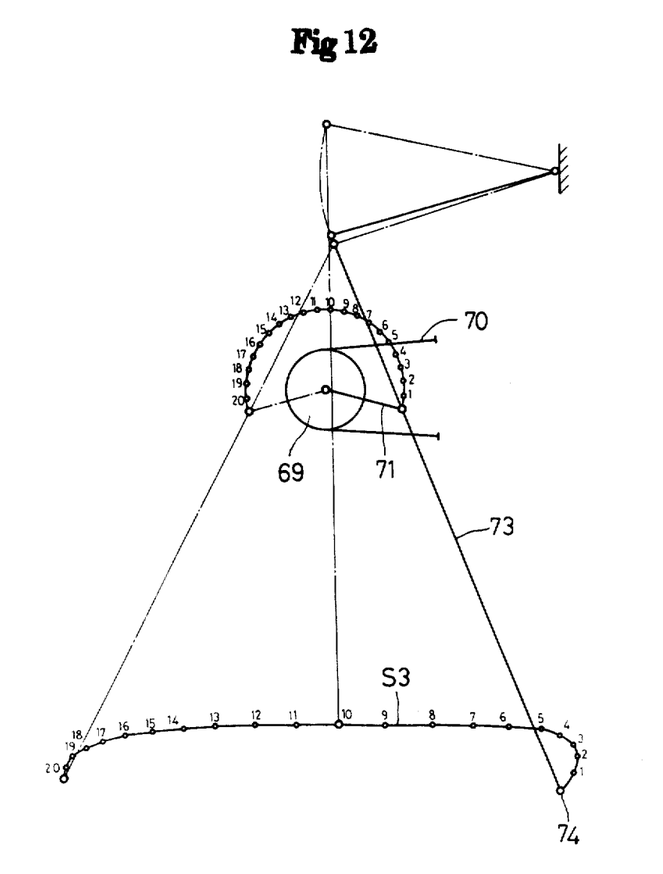
FIG. 12 is an operational diagram thereof.

The construction of this embodiment enables the given pivotal angle $\theta_1$ obtained by the rotatably oscillating arm 66 moved by the crank arm 65 to be transmitted to the oscillating arm 71 through the pulleys 68 and 69 and the belt 70 and augmented to an angle $\theta_2$ greater than 180°. Such an augmented angle $\theta_2$ allows an holder arm assembly 74 forming one side of the quadric parallel link 72 to move back and forth in a locus S3, as shown in FIG. 12, for ease of loading and unloading operations.

What is claimed is:

1. A loading apparatus for use in combination with a working machine comprising:
- an L-shaped mounting frame (6) having a vertical side and a horizontal side and fixedly connected to said working machine in vertical alignment and generally above the working position;
- a first quadric parallel link (21) having two spaced parallel rods (20), one end of each rod (20) being pivoted to the vertical side of said L-shaped mounting frame (6);
- a floating L-shaped parallel travel member (19) having a vertical side (19A) and a horizontal side (19B), said vertical side (19A) being pivoted to the other ends of said rods (20);
- a second quadric parallel link (27) having a primary rod (26) and a secondary rod (25) both being pivoted at one end to said horizontal side (19B) of said floating L-shaped parallel travel member (19);
- a holder arm assembly (24) pivoted to the other ends of said primary rod (26) and said secondary rod (25) and constituting one side of a said second quadric parallel link (27), said holder arm assembly (24) including a venturi cap (29) operatively connected thereto for holding a workpiece (23);
- a coupling shaft (16) rotatably mounted to the horizontal side of said L-shaped mounting frame (6) through a bearing means (15);
- a first oscillating arm (28) pivotally connected at one end to said primary rod (26) of said second quadric parallel link (27) intermediate the ends of said primary rod (26) and at the other end to one end of said coupling shaft (16);
- an electric motor (10) with a reduction gear (11) fixedly connected to the vertical side of said L-shaped mounting frame (6) through a bracket (7), said reduction gear having an output shaft (12);
- a crank arm (13) pivotally connected at one end to said output shaft (12) of said reduction gear (11); and
- a second oscillating arm (17) pivotally connected at one end to the other end of said coupling shaft (16) and at the other end to the other end of said crank arm (13) through a rod (18).

2. A loading apparatus as defined in claim 1 wherein said holder arm assembly (24, 49) further includes:
- an arm support (33) pivoted to said second quadric parallel link (27, 50) to constitute one side of said second quadric parallel link (27, 50);
- a holder carrier (35) fixedly connected to said arm support (33);
- a holder block (37) adapted for retaining engagement with said holder carrier (35);
- an arm (30) fixedly connected to said holder block (37);
- a coil spring (41) interposed between said holder carrier (35) and said holder block (37) so as to be connected at one end to said holder carrier (35) and at the other end to said holder block (37), said coil spring (41) being effective to hold the engagement of said holder block (37) with said holder carrier (35); and
- a limit switch (LS1) fixedly mounted to said holder carrier (35) for sensing the engagement condition of said holder block (37) with said holder carrier (35).

3. A loading apparatus as defined in claim 1 wherein said holder arm assembly (24, 49) further includes:
- an arm support (33) pivoted to said second quadric parallel link (27, 50) to constitute one side of said second quadric parallel link (27, 50);
- a plurality of magnetic holders (45) fixedly connected to said arm support (33);
- a holder block (47) adapted to be magnetically carried by said magnetic holders (45);
- an arm (30) fixedly connected to said holder block (47); and
- a limit switch (LS2) operatively connected to said arm support (33) for sensing the attraction of said holder block (47) to said magnetic holders (45).

4. A loading apparatus for use in combination with a working machine comprising:
- an L-shaped mounting frame (6) having a vertical side and a horizontal side and fixedly connected to said working machine in vertical alignment and generally above the working position;
- a first quadric parallel link (21) having two spaced parallel rods (20), one end of each rod (20) being pivoted to the vertical side of said L-shaped mounting frame (6);
- a floating L-shaped parallel travel member (19) having a vertical side (19A) and a horizontal side (19B), said vertical side (19A) being pivoted to the other ends of said rods (20);
- a second quadric parallel link (50) having a primary rod (26) and a secondary rod (25) both being pivoted at one end to said horizontal side (19B) of said floating L-shaped parallel travel member (19);
- a holder arm assembly (49) pivoted to the other ends of said primary rod (26) and said secondary rod (25) and constituting one side of said second quadric parallel link (50), said holder arm assembly (49) including a venturi cap (29) operatively connected thereto for holding a workpiece (60);
- a coupling shaft (52) rotatably mounted to the horizontal side of said L-shaped mounting frame (6) through a bearing means (15);
- a first oscillating arm (51) pivotally connected at one end to said primary rod (26) of said second quadric parallel link (50) intermediate the ends of said primary rod (26) and at the other end to one end of said coupling shaft (52);
- an electric motor (54) with a reduction gear (11) fixedly connected to the vertical side of said L-shaped mounting frame (6) through a bracket (7), said reduction gear having an output shaft (12);
- an intermediate arm (57) disposed generally below said electric motor (10) and pivotally connected to the vertical side of said L-shaped mounting frame (6) through a shaft (56);
- a crank arm (55) pivotally connected at one end to said output shaft (12) of said reduction gear (11);
- a first rod (58) pivotally connected at one end to the other end of said crank arm (55) and at the other end to said intermediate arm (57) intermediate the ends of said intermediate arm (57);
- a second rod (59) pivotally connected at one end to the extreme end of said intermediate arm (57); and
- a second oscillating arm (53) pivotally connected at one end to the other end of said second rod (59) and at the other end to the other end of said coupling shaft (52);
- whereby pivotal movements of said first rod (58) and said second rod (59) cause an amplified pivotal movement of said second oscillating arm (53) relative to the pivotal movement of said intermediate arm (57).

* * * * *